Sept. 11, 1951 E. M. WILLIAMS 2,567,261

COMBINED SEARCH RECEIVER AND RADIO JAMMING SYSTEM

Filed Jan. 23, 1945 2 Sheets-Sheet 1

INVENTOR.
EVERARD M. WILLIAMS
BY William D. Hall
ATTORNEY

Sept. 11, 1951 E. M. WILLIAMS 2,567,261

COMBINED SEARCH RECEIVER AND RADIO JAMMING SYSTEM

Filed Jan. 23, 1945 2 Sheets-Sheet 2

INVENTOR.
Everard M. Williams
BY Harry M. Saragovitz
Attorney

Patented Sept. 11, 1951 2,567,261

UNITED STATES PATENT OFFICE 2,567,261

COMBINED SEARCH RECEIVER AND RADIO JAMMING SYSTEM

Everard M. Williams, Dayton, Ohio

Application January 23, 1945, Serial No. 574,163

1 Claim. (Cl. 250—13)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio systems and more particularly to a combined search receiver and jammer system.

The objects of the present invention comprise the provision of an improved combined search receiver and jammer system wherein a search receiver having a calibrated cathode ray tube screen permits the determination of the frequencies of any and all intercepted signals appearing thereon, and a desired plurality of individually or simultaneously operating jamming channels that may be individually or simultaneously applied to any or all of the intercepted signals at their individual frequencies by operation of a multiple contact single central control; and which system preserves radio silence when not actively jamming.

With the above and other objects in view that will be apparent from the following description to those who are informed in the radio art of receiving and jamming signals, suitable illustrative embodiments of the present invention are disclosed in the accompanying drawing wherein—

Figures 1, 2:
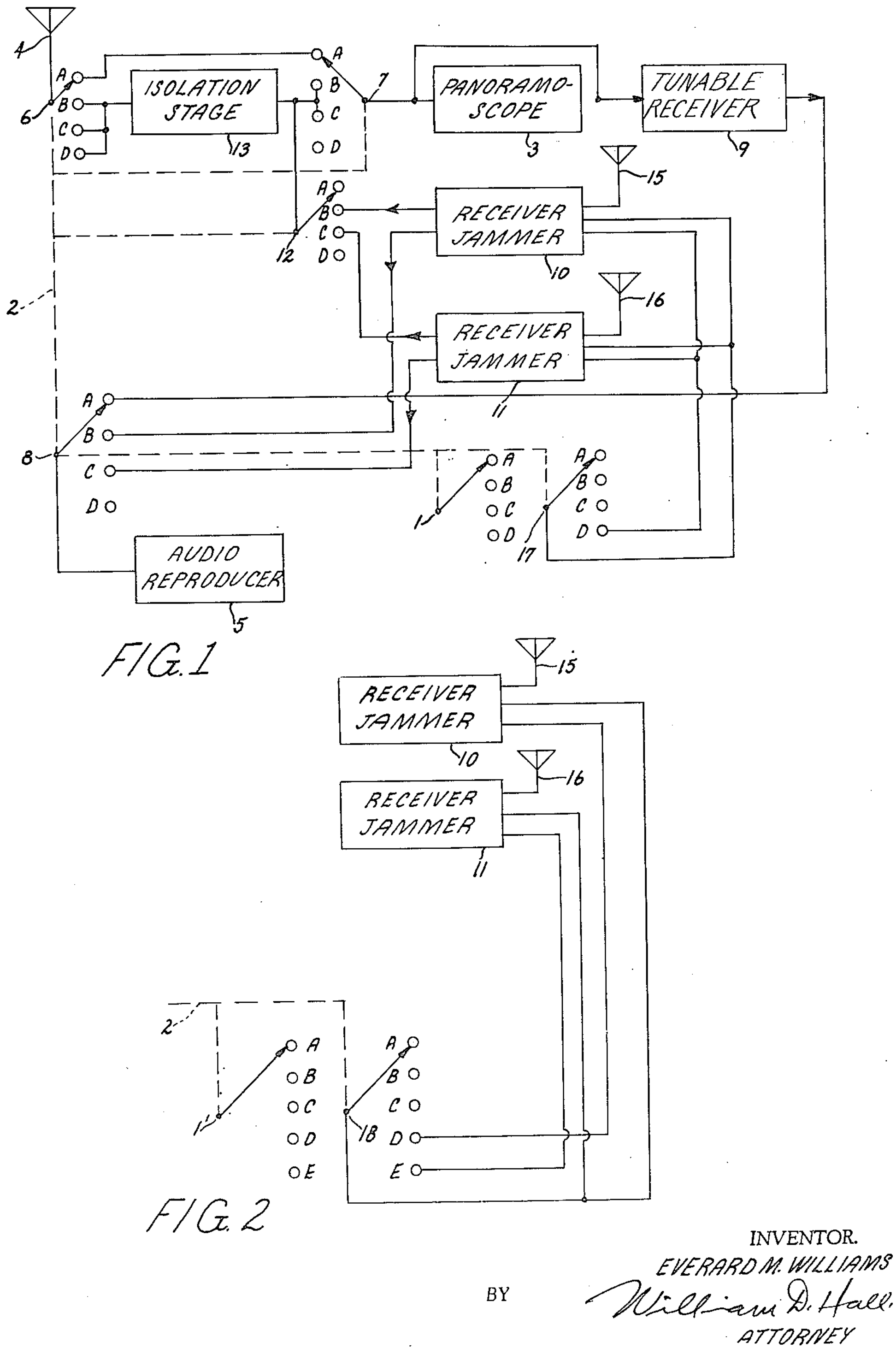
Fig. 1 is a block diagram of a device that embodies the present invention.
Fig. 2 is a fragmentary block diagram of a modified part of the circuit that is shown in Fig. 1.

The combined search receiver and jammer system that is illustrated in Figs. 1 and 2 of the accompanying drawing comprises a plurality of block circuits that are interconnected by a desired plurality of multiple contact switches, all of which are in the same order as shown and are ganged and operated simultaneously from a single master control switch 1 that is disposed upon a control panel or the like. A dotted line 2 indicates the ganged control among the various switches by means of which the various block circuits shown are connected. Each switch preferably comprises a desired plurality of individual contacts A, B, C, D, etc. The switches are associated in families bearing the same indicating letter so that when the arm of the master control switch 1 is on a contact designated by a particular letter, all of the other switch arms are applied to respective contacts that are designated by that same letter.

A panoramoscope 3 comprises a panoramic receiver provided with a calibrated cathode ray tube screen for visual indication of intercepted radio signals. The receiver may be of any one of a number of well known types of apparatus such as, for example, the receivers described in U. S. Patents 2,279,151; 2,378,604 and 2,381,940 to Marcel Wallace. However, it is to be understood that the invention does not reside in the panoramoscope 3 as such but the combination of elements described herein.

The combined search receiver and jammer system that is illustrated in the accompanying drawing comprises the panoramoscope 3 that provides visual presentation of radio energy that is intercepted by its antenna 4. The radio energy is also fed thru a tunable receiver 9 to an audio reproducer 5 for auditory analysis thereof when the master control switch 1 is in position A with the panoramoscope switches 6 and 7 and the audio reproducer switch 8 in their respective positions A as shown. The audio reproducer switch 8 has its A position connected thru the receiver 9 to the antenna 4 to conduct the output thereof and its other contacts connected to tunable receiver jammers 10, 11, etc. The receiver 9 selectively tunes in on intercepted signals that appear as pips on the cathode ray tube screen of the panoramoscope 3. At this step in the procedure the receiver jammers 10, 11, etc. are in receiving adjustment, intercepted radio energy being fed to these receivers through antennas 15 and 16. The inclusion of the audio reproducer 5 for listening to the signal beat frequency tones from the receiver 3 in addition to the visual presentation of intercepted signals upon the panoramoscope 3, is for the purposes of complete and sharp audio signal analysis. With the master control switch 1 in the A position the respective frequencies of all of the intercepted signals that are to be jammed are made available for purposes of their individual analysis and use.

A sufficient number of tunable receiver jammers 10, 11, etc. should be available for simultaneously jamming all of the intercepted signals that are to be jammed at their respective frequencies. At this part of the procedure the operator searches for intercepted signals by use of the panoramoscope 3 and may monitor the signals when discovered.

Preparatory to actually jamming the intercepted signals, the master control switch 1 is turned to position B, whereupon all other switches that are ganged therewith are also applied to their respective B positions.

With all of the switch arms of the circuit in their respective positions B, the panoramoscope 3 and the receiver jammer 10, thru its switch 12, are maintained in radio silence with respect to the antenna 4 by the interposition of an untuned isolation stage 13 therebetween. The isolation stage 13 prevents signals from passing from panoramoscope 3 and the receiver jammers 15 and 16 to antenna 4 but does not prevent radio energy from passing in the opposite direction. The receiver jammer 10 is then tuned to the frequency which was located by tuning the receiver 9 thereon, at which frequency one of the intercepted signals is to be jammed by suitable means, such as by radio noise emission or the like, from its antenna 15 at a subsequent setting of the master control switch 1. The method of tuning the receivers is more specifically set out below.

In a similar manner the next intercepted signal that is located by the tuning of the receiver 9 and that is to be jammed, is tuned in by positioning all of the switches that are operated by the master control switch 1 upon their respective C positions and tuning the receiver jammer 11 to the frequency of the second intercepted signal. Suitable means, such as the antenna 16 is provided for the emission of jamming radio energy from the receiver jammer 11 at the frequency of the second intercepted signal. As in the previously described switch setting, the isolation stage 13 serves to maintain radio silence for the panoramoscope 3 and for the receiver jammer 11 when the switch settings are at the contact C.

The foregoing procedure is repeated, with the inclusion of a suitable number of additional receiver jammers 10, 11, etc., that conforms with the number of individual intercepted signals that are to be jammed, each additional receiver jammer being similarly individually tuned to the individual frequencies of the respective intercepted signals to be jammed.

Upon completion of the tuning of the receiver jammers 10, 11, etc. upon a desired number of intercepted signals to be jammed, the master control switch 1 is turned to its jamming position which, in the accompanying drawing is indicated by the switch position D. When so positioned the tuning signals generated by the receiver jammers 10, 11, etc. as set out below, which are displayed on the panoramoscope 3 when the switch 1 is in positions B and C, are removed from the panoramoscope 3. All of the intercepted signals, to the individual frequencies of which a receiver jammer 10, 11, etc. has been tuned, are simultaneously jammed by positioning the major control switch upon its position D. When so positioned the jammer emission switch 17 simultaneously excites all of the receiver jammers 10, 11, etc. to the emission of jamming noise over their respective antennas 15, 16, etc. so that all intercepted signals to which the receiver jammers 10, 11, etc. are individually tuned may be jammed at one time and wholly without prior warning to the source of the intercepted signals.

When jamming intercepted signals, the panoramoscope 3 and the audio reproducer 5 are preferably, although not necessarily, non-receptive since the switch positions 7D and 8D are open. The isolation stage 13 is preferably protected against the violence of the jamming operation in any suitable manner, as by making the switch position 12D open, or the like. Since the switch position 17D is the jamming position for this switch 17 and since it is desirable that radio silence be maintained prior to the actual jamming operation the other positions of the jamming switch 17 are open.

In operation the various switches of the set are simultaneously placed in their respective A positions by placing the master control switch 1 in its A position. When so connected a time sweep is maintained upon the screen of a cathode ray tube that forms a part of the panoramoscope 3. Signals that are intercepted by the antenna 4 and that are within the frequency range of the panoramoscope 3 appear as deflections of, or pips rising from, the time sweep base line on the cathode ray tube screen of the panoramoscope 3, which screen is calibrated so that the various frequencies of the individual signals are determinable therefrom.

Figure 3:
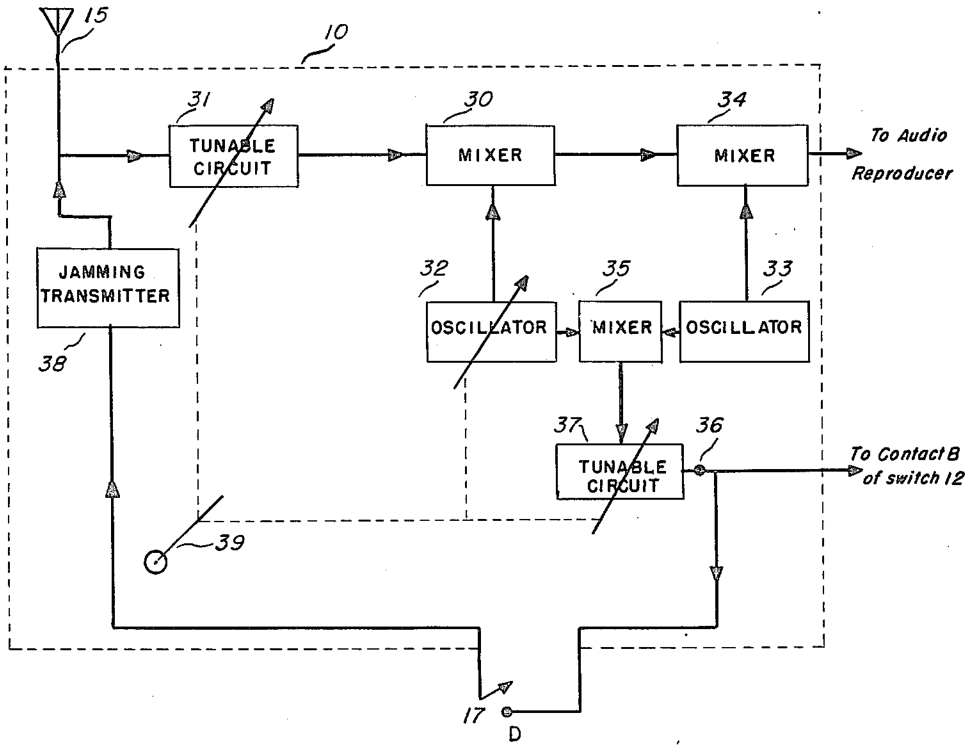
Fig. 3 is a schematic diagram in block form of a receiver jammer incorporated in the present invention.

The selective jamming of an individual signal or the simultaneous jamming of a plurality of signals is then accomplished by turning the master control switch 1 to its B position and tuning an oscillator 32 shown in Fig. 3 in the receiver jammer 10 whereby the pip generated in response to the tuning signal from receiver jammer 10 is moved laterally into optical registration with a pip generated by an intercepted signal or in other words, to the frequency of a signal to be jammed, where the device is limited to a single receiver jammer 10 with the omission of the switch C positions and their connections, or by successively repeating the above process for the various signals that are to be jammed where a plurality of receiver jammers 10, 11, etc. are in the device. With the various jammers 10, 11, etc. tuned to the respective frequencies of a plurality of signals to be jammed simultaneously, the master control switch 1 is placed on its last or jamming position, as shown at position D on switch 17 whereupon the sending antennas 15, 16, etc. simultaneously emit jamming radio energy on each of the frequencies of each of the signals being jammed.

Each of the receiver jammer circuits 10, 11, etc. comprises a combination search receiver and jamming transmitter set as shown in Fig. 3. The search receiver is a superheterodyne circuit comprising a mixer 30, a tunable circuit 31 and a local oscillator 32, both circuit 31 and oscillator 32 manually tunable by a ganged control 39 by means of which the receiver is tuned on an intercepted signal that is to be jammed. The individual search receiver also comprises a weak signal fixed frequency oscillator 33 that beats with the output signals from mixer 30 in mixer 34, this mixer 34 being so constructed that it accepts only signals at frequencies in a narrow band about the frequency of oscillator 33. Oscillator 33 is tuned to the intermediate frequency of the search receiver. This oscillator 33 is used in conjunction with an intercepted signal to tune the search receiver by the method of zero beat by connecting the audio reproducer 5 to the mixer 34 through switch 8. The individual search receiver is also provided with an extra mixer 35 wherein the local oscillator 32 and the oscillator 33 signals are combined into a tuning signal which reproduces the signal frequency to which the search receiver is tuned. In accordance with standard practice, an adjustable tuned circuit 37 is interposed in the output circuit of mixer 35 to pass the tuning signal of desired frequency, since sum and difference frequency components appear in the output of mixer 35. The circuit 37 is tuned in connection with the tuning of oscillator 32, as is shown in Fig. 3. This signal appears at a special tuning signal terminal 36 of the set but is shielded from appearing elsewhere in the search receiver.

When it is desired to connect the individual set to jammer transmitter operation, this signal is amplified in a jamming transmitter 38, shown in Fig. 3, to supply the carrier of the jamming transmission, this carrier being modulated by noise signals in the transmitter 38 in any well known manner. In this manner the transmitting portion of the set emits a signal of the same frequency as that to which the search receiver portion of the set has been tuned. The intercepted signal is jammed very quickly after it is intercepted. This type of set is rapid in operation since no additional time is required to tune the transmitter after the search receiver is tuned on the intercepted signal. The combination of search receiver and jammer system in connection with the panoramoscope 3 has the advantage of displaying all of the signals that must be jammed so that it is impossible for an operator to pass over a signal unnoticed when tuning the individual receiver jammers 10, 11, etc. In other words, the panoramoscope 3 permits an operator to monitor continuously all of the intercepted signals that appear over the frequency band that is covered by the panoramoscope 3.

The positions B, C, etc. of the switches 7, 12, etc., permit the placing of the tuning signal of the receiver jammers 10, 11, etc., into the panoramoscope 3 so that the receiver jammers 10, 11, etc. may be put approximately into tune rapidly with the intercepted signals to be jammed and the fine tuning adjustment completed in the receiver jammers 10, 11, etc. with the assistance of the zero beat method utilizing the audio reproducer 5.

A unified control is provided by the single master control switch 1, whereby the various circuit manipulations are effected. As previously stated, the jamming transmitters preserve radio silence except when actually jamming intercepted signals. Toward this end tuned radio frequency stages such as tunable circuit 31 are provided in the various receivers in the device and the tuning signals in the receiver jammer sets 10, 11, etc., are shielded internally of the sets, which, together with the untuned isolation stage 13, prevents the tuning signals of the receiver jammer sets 10, 11, etc. from being emitted from the panoramoscope antenna 4.

One modification of the disclosed circuit has been previously referred to wherein but a single receiver jammer 10 is provided with the omission of the C positions of the various switches and the connections thereto.

Another modification of the disclosed circuit is shown in fragmentary form in Fig. 2 of the accompanying drawing, with its position in the circuit that is shown in Fig. 1 indicated by the showing of the parts thereof with which the modification parts are associated.

In the fragmentary circuit that is shown in Fig. 2, the master control switch 1 has a desired number of additional contacts added thereto as indicated by the additional contacts added thereto as indicated by the additional contact E. The switch 17 in the circuit shown in Fig. 1 has been replaced by a switch 18 that has a desired number of contacts in conformity with the number of contacts on the master control switch 1. The arm of the switch 18 forms a common conductor from which leads that are connected as shown, tap off to a desired plurality of receiver jammers 10, 11, etc., that are individually provided with sending antennas 15, 16, etc. The contacts for receiving signals on the panoramoscope 3, and for tuning the spot receiver 9 and the receiver portions of the receiver jammers 10, 11, etc. upon signals that are to be jammed, are as previously explained. In the installation shown, the contacts A, B, and C of the switch 18 are open. Of the remaining contacts, the contact D is connected with the receiver jammer 10 and the contact E is connected with the receiver jammer 11. Additional contacts would be connected with additional receiver jammers.

In operation, the tuning in of the panoramoscope 3, the spot receiver 9, and of the receiver jammers 10, 11, etc., would be as previously described. When ready to jam, the master control switch 1' would be turned to the contact D, thereby placing the contact engaging end of the arm of the switch 18 in electrical engagement with the switch 18 contact D. The making of this contact causes the receiver jammer 10 to emit jamming radio energy on the frequency to which the receiver jammer 10 is tuned from its sending antenna 15. In a similar manner the closing of the contact E of the switch 18 causes the receiver jammer 11 to emit radio energy of the frequency to which it is tuned from its sending antenna 16. In this manner one or a plurality of intercepted signals may be separately jammed independently of other signals to be jammed.

It is to be understood that the particular arrangement of components and parts of the circuits and the particular connections therebetween that have been illustrated and described herein have been submitted for the purposes of showing and describing illustrative embodiments of the present invention and that various modifications and changes may be made therein without departing from the scope of the present invention.

What I claim is:

In a radio jamming system, a panoramic receiver including means providing a visual presentation of all intercepted signals within a selected range of frequencies, a plurality of tunable search receiver jammer transmitter sets each of which generates a tuning signal and a beat signal, first means for selectively electrically coupling said tuning signal of each of said sets to said panoramic receiver for visually presenting said tuning signal simultaneously with said presentation of said intercepted signals, whereby visual alignment of said tuning signal with a selected one of said intercepted signals may be effected by tuning the selected set so that the frequency of said tuning signal will approximate that of said selected intercepted signal, an audio reproducer, said reproducer being selectively electrically connected to said selected set by said first means, said reproducer being responsive to said beat signal generated by the set to which it is connected during said tuning to aid in tuning said set by the method of zero beat, a tunable receiver being coupled to the input of said panoramic receiver, said audio reproducer being selectively coupled by said first means to said tunable receiver for aurally presenting selected signals, and means for switching said sets to transmitter operation, said last mentioned means being operable to couple said tuning signal in each of said sets to means for transmitting a jamming signal at the frequency of said tuning signal and said switching means also operable to disconnect said sets from said panoramic receiver and from said audio reproducer.

EVERARD M. WILLIAMS.

REFERENCES CITED

The following references are of record in the file of this patent:

UNITED STATES PATENTS

| Number | Name | Date |
|---|---|---|
| 2,363,583 | Gilman | Nov 28, 1944 |
| 2,412,991 | Labin | Dec. 24, 1946 |
| 2,418,139 | Preisman | Apr. 1, 1947 |